(12) United States Patent
Strittmatter et al.

(10) Patent No.: US 7,272,407 B2
(45) Date of Patent: Sep. 18, 2007

(54) DISPLAY ON WIRELESS MOBILE DEVICE

(75) Inventors: Michael Strittmatter, San Francisco, CA (US); Leo Robert Blume, Palo Alto, CA (US); Philip A. McCoog, Portland, OR (US); Rabindra Pathak, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 10/369,042

(22) Filed: Feb. 18, 2003

(65) Prior Publication Data

US 2004/0176117 A1 Sep. 9, 2004

(51) Int. Cl.
*H04B 7/00* (2006.01)
*H04Q 7/00* (2006.01)

(52) U.S. Cl. ............... 455/500; 455/41.2; 455/41.3; 455/420; 455/519; 370/338

(58) Field of Classification Search ............ 455/41.2, 455/41.3, 420, 517–519, 500; 370/338
See application file for complete search history.

(56) References Cited

U.S. PATENT DOCUMENTS

| | | | |
|---|---|---|---|
| 6,285,889 B1 | 9/2001 | Nykanen et al. | |
| 6,359,642 B1 | 3/2002 | Smith et al. | |
| 6,417,913 B2 | 7/2002 | Tanaka | |
| 2002/0083121 A1* | 6/2002 | Chang et al. | ............. 709/201 |
| 2003/0036350 A1 | 2/2003 | Jonsson et al. | |
| 2003/0115199 A1* | 6/2003 | Ochiai et al. | ............. 707/10 |
| 2004/0100505 A1* | 5/2004 | Cazier | ............. 345/811 |
| 2005/0073522 A1* | 4/2005 | Aholainen et al. | ............. 345/440 |

FOREIGN PATENT DOCUMENTS

| | | |
|---|---|---|
| DE | EP1107512 A1 * | 12/1999 |
| EP | 1107512 | 6/2001 |
| GB | 2360914 A * | 3/2001 |
| GB | 2360914 | 10/2001 |
| JP | 2002-264431 | 9/2002 |
| JP | 2002-290416 | 10/2002 |
| JP | 2002-305521 | 10/2002 |
| US | EP1271300 A2 * | 6/2002 |

OTHER PUBLICATIONS

"The Bluetooth System, Core, Version 1.0B"; Service Discovery Protocol; Dec. 1, 1999 XP002176975; Retrieved on Sep. 7, 2001 from URL:www.bluetooth.com.
Bluetooth Sig. Inc., "Assigned Numbers—Bluetooth Baseband", 2003, https://www.Bluetooth.Org/foundry/assignnumb/document/baseband.

(Continued)

*Primary Examiner*—Matthew Anderson
*Assistant Examiner*—Sujatha Sharma

(57) ABSTRACT

In one embodiment, a method is provided for a wireless mobile device where data is received over a wireless data connection indicative of presence of compatible components and a selection of the compatible components are displayed. Data is continued to be received further identifying the compatible components. The displayed selection of compatible components is changed in accordance with a convention and based on the continued receipt of data where the method is performed automatically by a wireless mobile device.

31 Claims, 11 Drawing Sheets

OTHER PUBLICATIONS

Hewlett Packard Co., On-line Customer Support Documents, "HP Jornada 520, 540, and 560 Series Pocket PC and HP Deskjet 995C—Printing with Bluetooth Using the Anycom, Inc. Bluetooth Card", 2001, http://www.hp.com/cposupport/printers/support_doc/bpd09285.html.

Bluetooth Specification Version 1.1, "Service Discovery Application Profile", Feb. 22, 2001, pp. 64-98.

* cited by examiner

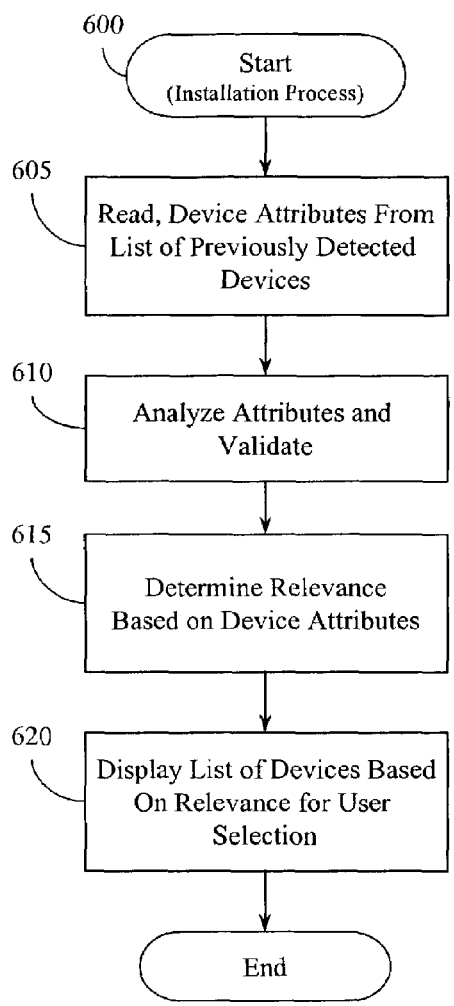
Figure 6
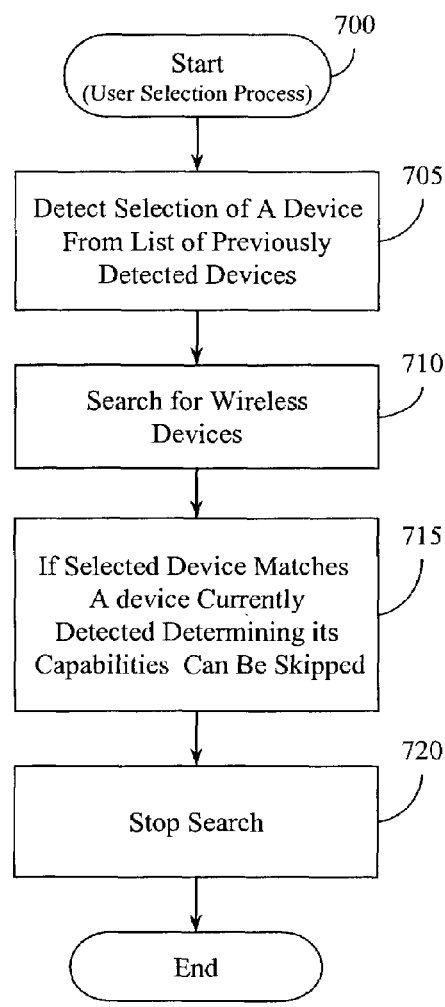
Figure 7
| Service Classes | Major Device Class | Minor Device Class | Format Type |
Figure 8

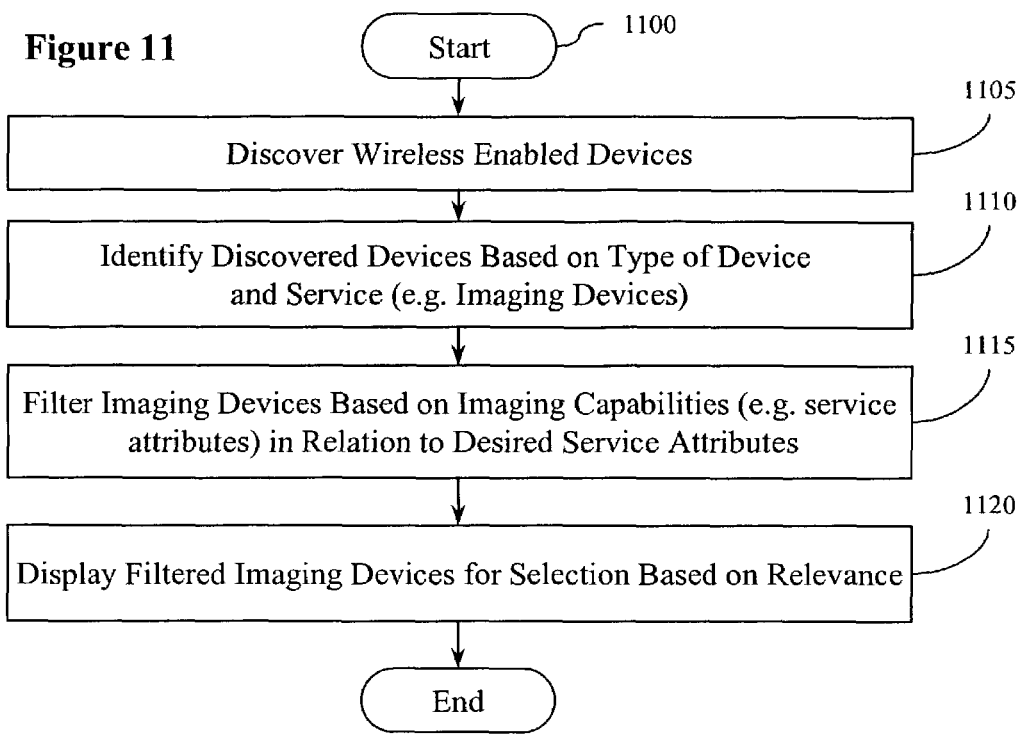
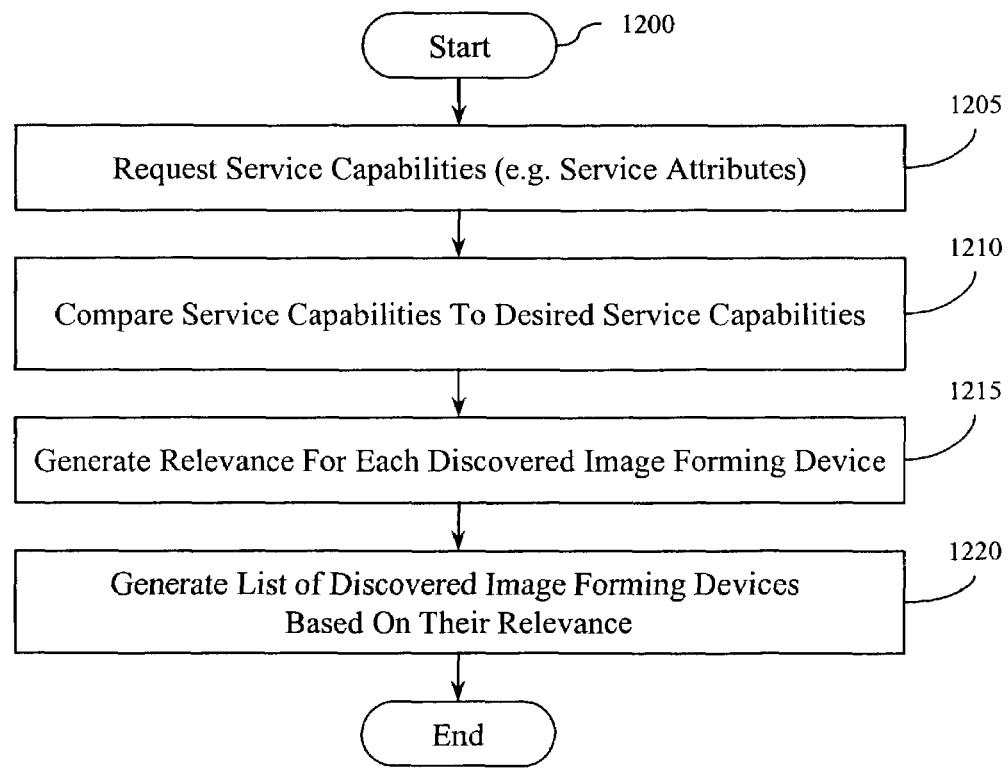

DISPLAY ON WIRELESS MOBILE DEVICE

BACKGROUND

When a user of a wireless mobile device wishes to request services from or otherwise communicate with an other wireless device, the user would initiate a search to locate other wireless devices within its communication area. For example, when a user of a personal digital assistant (PDA) desires to transmit a file to a nearby computer, the user would instruct the PDA to search for an eligible wireless device. Assuming that both the PDA and the computer used the same wireless communication protocol, the computer may be discovered and a communication link could be established between the two devices. Locating one or more eligible devices typically takes some time. In some cases, the user may not initiate the search process early enough to ensure it completes before the user is ready to begin a desired task. An improved system for communicating between wireless devices may improve a user's experience with wireless devices.

The present invention provides a new and useful method and system for wireless enabled devices.

BRIEF DESCRIPTION OF THE DRAWINGS

In the accompanying drawings which are incorporated in and constitute a part of the specification, embodiments of a system and method are illustrated which, together with the detailed description given below, serve to describe the example embodiments of the system and method. It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa.

FIG. 6 is one embodiment of an installation methodology.

FIG. 7 is one embodiment of a user selection methodology.

FIG. 8 is one embodiment of a class of device data record.

FIG. 11 is one embodiment of a methodology for filtering discovered devices.

FIG. 12 is another embodiment of a methodology for filtering discovered devices.

DETAILED DESCRIPTION OF ILLUSTRATED EMBODIMENTS

Figure 1:
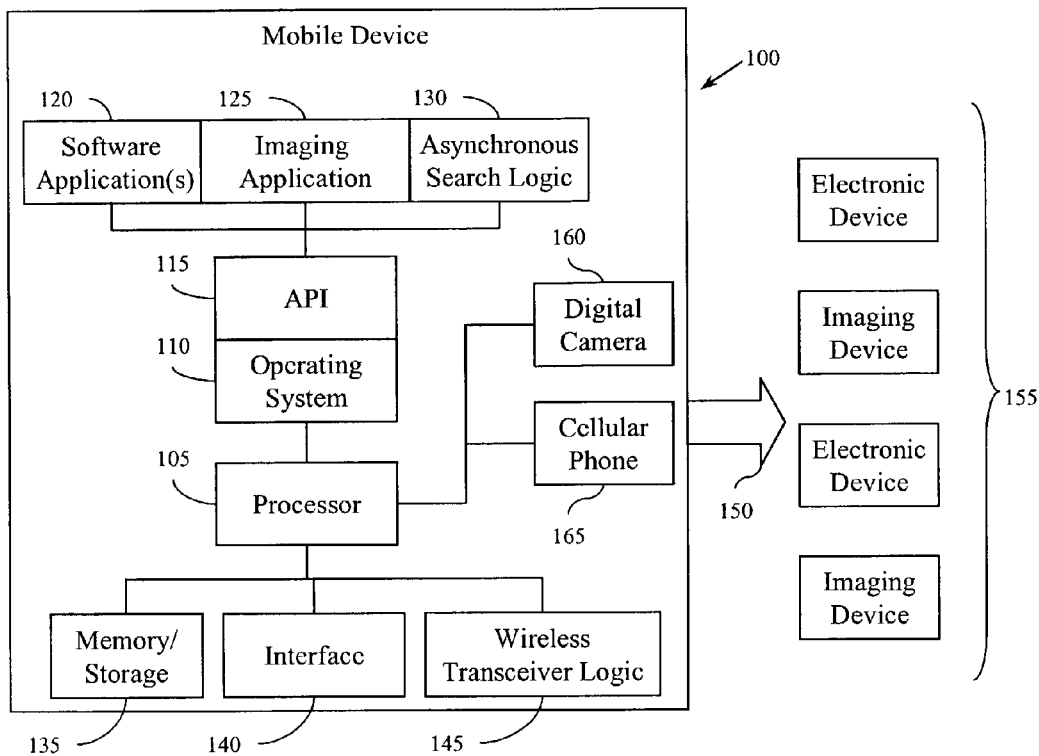
FIG. 1 is one embodiment of a wireless enabled mobile device.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Address", as used herein, includes but is not limited to one or more communication network accessible addresses, device identifiers, IP addresses, e-mail addresses, a distribution list including one or more e-mail addresses, url and ftp locations or the like, network drive locations, a postal address, or other types of addresses that can identify a desired destination or device.

"Computer-readable medium", as used herein, refers to any medium that participates in directly or indirectly providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications, or take the form of one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read. Signals used to propagate instructions or other software over a network, such as the Internet, are also considered a "computer-readable medium."

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical signals, analog or digital signals, one or more computer or processor instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"User", as used herein, includes but is not limited to one or more persons, software, computers or other devices, or combinations of these.

Generally speaking, one embodiment of a system and method is provided for use with a wireless enabled mobile device. The system and method assist in discovering other wireless enabled devices in order to process a job request. In one embodiment, the system is configured to discover wireless enabled imaging devices for processing a print request while concurrently allowing a user of the mobile device to perform other tasks while the search is being performed. Other embodiments and features are described in more detail in the following examples.

Illustrated in FIG. 1 is one embodiment of a mobile device 100 that is configured for wireless communication. The mobile device 100 may be embodied in a variety of forms and may include a variety of features. For example, the mobile device 100 may be a cellular device, a personal digital assistant, a digital camera, a digital camera enabled mobile phone, a portable computer, or other type of processing device. The mobile device 100 may include a processing system that has, for example, a processor 105, an operating system 110, and an application program interface (API) 115 to provide communication between one or more software applications 120 and the operating system 110. Although the processing system of the mobile device 100 can be configured to execute a variety of software applications 120, the following embodiment will be described with reference to an imaging application 125 and an asynchronous search logic 130.

The imaging application 125 represents a software application that allows a user to print or otherwise image a selected document, a file, an image, or other data. The imaging application 125 can be, for example, a word processing application, a photo processing application, a browser, or other software that allows printing.

Other components of the mobile device 100 may include memory and/or storage 135 that can include any type of computer-readable medium. The storage 135 may also include a port that accepts and reads data stored on a removable memory card or other removable computer-readable medium. An interface 140 can include a display screen, one or more buttons, a pointing device, or other types of devices that can communicate data to a user and receive input from a user. To perform wireless communication, a wireless transceiver logic 145 is provided. Depending on the wireless communication protocol desired, the transceiver logic 145 can be configured according to different specifications.

In one embodiment, the wireless protocol is Bluetooth and the transceiver logic 145 would include a Bluetooth radio and antenna. The Bluetooth specification can be found at www.bluetooth.org. Other protocols include IEEE 802.11, details of which can be found on the Internet at www.ieee802.org., or other available wireless protocols. In one embodiment, the wireless transceiver logic 145 includes a radio frequency transceiver configured to transmit and receive radio frequency signals but could also be any type of transceiver having a low power transmitter capable of short distance transmissions (e.g. less than 100 meters). Infrared communication can also be used. The transceiver logic 145 may be embodied as a microchip within the mobile device 100, or can be configured on a removable device such as a PCMCIA card (PC card) that can be connected and disconnected to the mobile device 100 via a connection port or slot.

With further reference to FIG. 1, before the mobile device 100 transmits a job request to another wireless enabled device for processing, one or more appropriate devices need to be located or otherwise discovered. Since the mobile device 100 is requesting a service in this scenario, it will also be referred to as a client device, and since the appropriate device is providing a service, it will also be referred to as a server device. An appropriate server device, for example, should have a compatible wireless communication protocol and have certain functionalities in order to process the job request. The functionalities will, of course, depend on the type of job request.

In a simplified embodiment, the asynchronous search logic 130 causes the wireless transceiver logic 145 to broadcast one or more signals 150 that inquire as to the presence of other wireless enabled devices 155 that are within the range of the signals 150. Devices that use a compatible wireless communication protocol as the wireless transceiver logic 145 may transmit back an acknowledgement signal in response to the inquiry signal. It will be appreciated that a compatible device refers to a device that can wirelessly communicate with the mobile device 100. For example, the compatible device may have the same wireless communication protocol and/or logic as the mobile device 100, may have a similar logic, or may have a wireless logic that may be different but is configured to recognize and communicate with the wireless communication protocol of the mobile device 100.

Typically, searching for and establishing wireless communication with a server device takes some time. In order to reduce delay time to a user of the mobile device 100, in one embodiment, the asynchronous search logic 130 is configured to be executed asynchronously with other processes and applications running on the mobile device 100. In other words, the search process is executed as a background task by the operating system 110 allowing the user to perform other tasks while the search process is being performed. It will be appreciated that the search logic 130 may be embodied in different forms such as a stand-alone application, a terminate and stay resident program, a device driver, or other type of software or logic that can be executed in the background. In that regard, an execution logic (not shown) can be provided that is configured to execute the search logic asynchronously as a background task. The execution logic can be part of an operating system, part of the search logic, or both, or a separate piece of software.

In an effort to further reduce the delay time to a user, the asynchronous search logic 130 may be configured to execute automatically in response to a triggering event. Thus, the user may be unaware that a search is being performed. For example, when the imaging application 125 is started, that may trigger the execution of the search logic 130. The assumption in this case is that the imaging application 125 allows a user to select a print option. Rather than waiting for the user to initiate the search logic 130, delay time can be reduced by performing the search before the user decides to print. By the time the user is ready to print, an available print server may already be discovered and ready to accept a print request. Other types of triggering events are described in the following sections.

Figure 2:
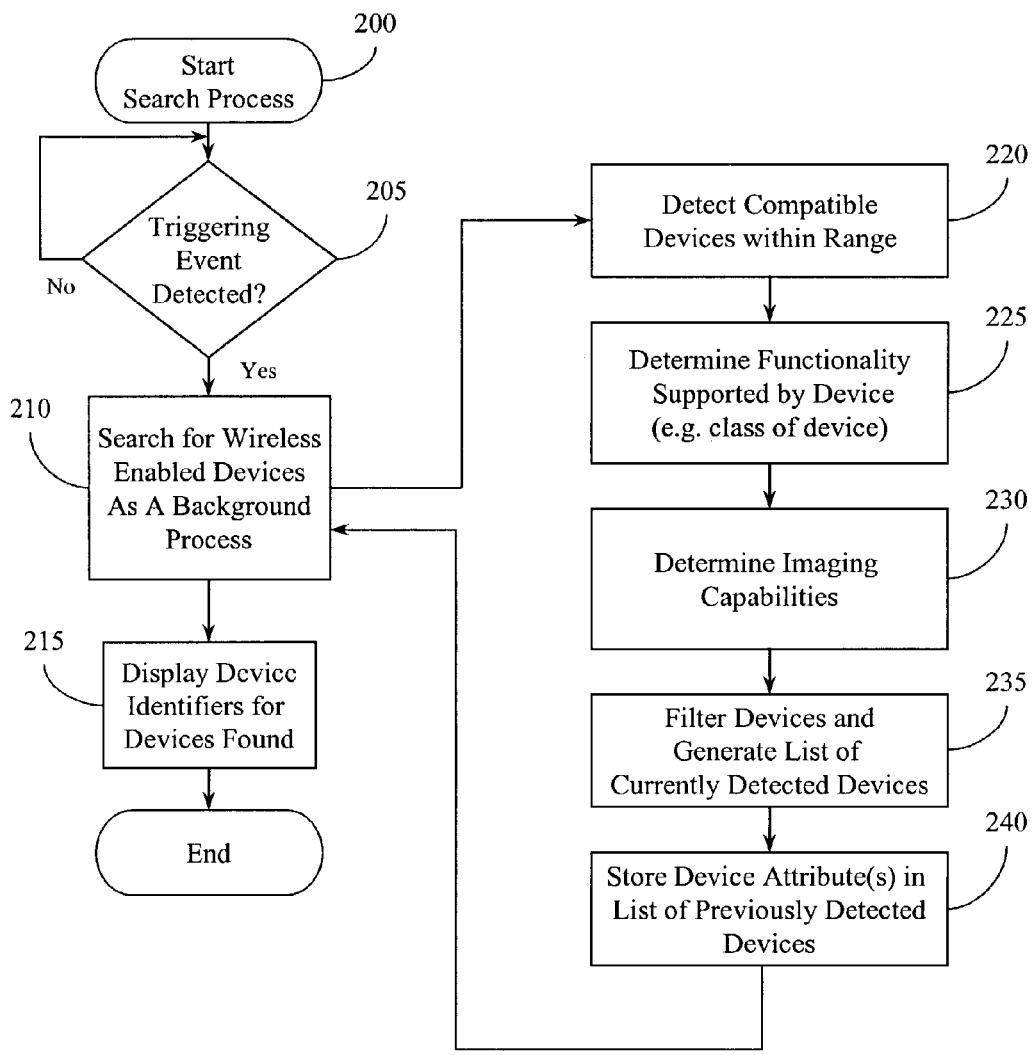
FIG. 2 is one embodiment of a search methodology for discovering other wireless enabled devices.

Illustrated in FIG. 2 is one embodiment of a search methodology 200 for discovering other wireless enabled devices capable of communicating with the client device. The illustrated elements denote "processing blocks" and represent software instructions or groups of instructions that cause a computer to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, do not depict syntax of any particular programming language. Rather, the diagram illustrates functional information one skilled in the art could use to fabricate circuits, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 2, the search is initiated once a triggering event is detected (block 205). The triggering event can be configured as a user initiated event, or a non-user initiated event that causes the execution of the search process even without a user's knowledge. The non-user initiated event, also referred to as automatic, can be associated with another software application, based on a timed interval, based on a system event such as a power up, or other type of automatic event. In one embodiment, the triggering event is associated with another software application such that when the software application is initiated, the search process is triggered. The search is performed as a background process that attempts to locate other wireless enabled devices (block 210). If one or more devices are located, device identifiers, or other identification data, corresponding to each device located can be displayed (block 215). The display may appear automatically, or appear based on a user request.

With reference again to FIG. 1, as another example, in one embodiment the mobile device 100 includes a digital camera 160 and a cellular phone 165, also referred to as a camera enabled phone. Presume that the search process is configured to locate imaging devices that can accept wireless print jobs. Also presume that the triggering event is based on an imaging application such as a photo-processing program. In response to a user starting the photo-processing program, the search process would be automatically initiated and executed asynchronously with the photo-processing program. As the user opens the photo-processing program, locates and selects desired photos, and performs other functions with the program, the search process can be locating available imaging devices that may be capable of printing photos.

By the time the user is ready to select a print function in the photo-processing program, the search process may be complete or nearly complete and could display the located imaging devices to the user. Once the user selects an imaging device, the transceiver logic 145 would establish a wireless communication link or channel with the transceiver of the selected imaging device and transmit the imaging request. Performing the search process as a background task allows the user to continue interaction with other applications and the mobile device 100 during the search process. Waiting time may be reduced and may improve the user's experience with using the mobile device 100.

With further reference to FIG. 2, another embodiment of the search process is shown. Once the search at block 210 is initiated, a variety of tasks can be performed during the search based on the communication protocol implemented and what type of wireless devices are being searched for. For example, the search can make an inquiry for and try to detect compatible wireless devices (server devices) within a communication range (block 220). As mentioned previously, a compatible device includes those that have the same or similar wireless logic and protocol, or those devices that can recognize a different protocol. Locating and displaying all compatible server devices may not be useful to a user that is performing a specific task. Using the above photo-processing example, it would be helpful to filter the located server devices that are most likely capable of printing a photograph. In that regard, the search can attempt to determine the functionality supported by a detected server device (block 225).

This determination can be accomplished in different ways based on the wireless protocol used. For example, if the Bluetooth protocol is being used, the detected server device would respond to an inquiry and return various information relating to the server device. For example, the server device could return its Bluetooth device address, device name, clock, and/or Class of Device/Service parameters. The Class of Device/Service parameters contain data representing characteristics about the server device, and an example is shown in FIG. 8. At the time of filing of the present application, the Class of Device/Service parameters for the Bluetooth protocol are defined by a 24-bit data field that includes assignments for Major Device Classes (5 bits), Minor Device Classes (6 bits), and Service Classes (11 bits). The 24-bit data field also includes a format type field of 2 bits. Of course, other configurations can be used. It will be appreciated that the class of device/service parameters may also be referred to as "device/service parameter data" and may include one or more of the above types of information regardless of how such information may be label by a wireless protocol.

Examples of Major Device Classes include miscellaneous (bit value 00000), computer (bit value 00001), phone (bit value 00010), LAN/network access point (bit value 00011), audio/video (bit value 00100), peripheral (bit value 00101), imaging (bit value 00110), and uncategorized (bit value 11111). The Minor Device Classes include sub-categories for each Major Device Class that further characterizes the device. For example, the Minor Device Classes for the imaging major class include display, camera, scanner, and printer. Examples of the service classes include positioning, networking, rendering, capturing, object transfer, audio, telephony, and information. Thus, if the search is inquiring for a printing device and a detected device is not an "imaging" device based on its Major Device Class, the detected device can be removed as an eligible printing device. If the major device class is "imaging" and the minor device class is "printer," then the detected device may be an eligible printing device. A more detailed list of assigned classes can be found at www.bluetooth.org. Of course, it will be appreciated that other forms of data and assigned values can be configured to designate the type of device and other characteristics.

If the detected device is an imaging device, its imaging capabilities can be determined (block 230). Furthermore, the type of imaging device may also be determined such as whether the device is a printer or printing device. With the Bluetooth protocol, this can be performed using the Class/Service Discovery profile defined by Bluetooth which will be described in greater detail below. At the time of this application, Bluetooth enabled imaging devices may support a basic printing profile (BPP) which may be determined with an inquiry. The basic printing profile describes the use of a page description language (e.g. XHTML-Print) and an image encoding standard (e.g. JPEG). Image forming devices that support BPP (sometimes referred to as a BPP printer) have image rendering capability. A mobile device not having rendering capability would need to submit a print request to an imaging device with rendering capability in order to have the print request processed.

The detected devices are then filtered based on their type and functionality, and a list of currently detected devices is generated (block 235). For each detected imaging device, its device attributes can be stored in a list of previously detected devices (block 240) which can be used during subsequent searches for imaging devices. The stored attributes will be described in greater detail with reference to the installation process.

Figure 3:
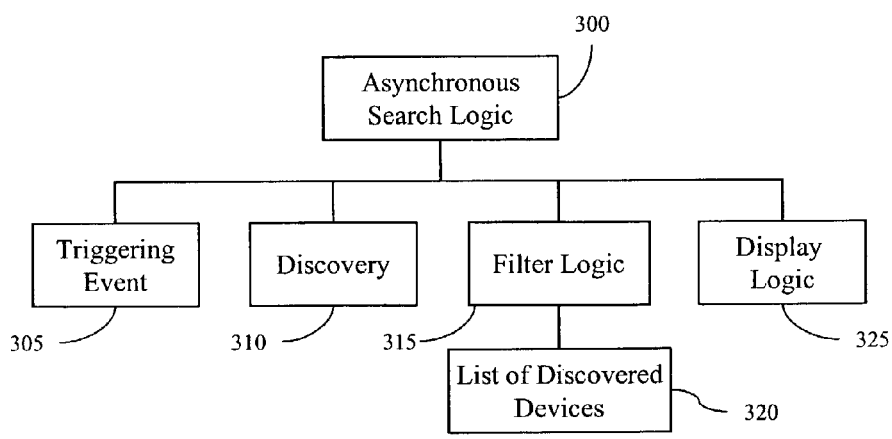
FIG. 3 is one embodiment of an asynchronous search logic.

With reference to FIG. 3, another embodiment of an asynchronous search logic 300 is shown. The search logic is configured to be initiated based on a triggering event 305. In one embodiment, the triggering event 305 can be configured to automatically initiate the search logic 300 without the user being aware of the initiation. A discovery component 310 is configured to communicate with a wireless transceiver of the device and instructs the transceiver to discover other compatible wireless enabled devices (server devices) in accordance with an implemented wireless communication protocol. As information is received from server devices acknowledging the discovery request, a filter logic 315 can be configured to filter the detected server devices based on the relevance or ability of the server device to process the job request. For example, the filter logic 315 can remove detected devices if not of a particular type. The filter logic 315 can then generate a sorted list 320 of detected devices based on a relevance ranking of the device's capabilities. Other relevance identifiers can also be generated that can distinguish a detected device for a user such as a relevance score, an icon, colors, or other type of visual distinction. A display logic 325 can then display the filtered list of detected devices 320 and present them to a user for selection.

The asynchronous search logic 300 can be embodied on a computer-readable medium in various forms. It may be a stand-alone application that is loaded onto a mobile device 100, it can be part of an operating system pre-loaded into a mobile device, it can be maintained as an object such as a device driver loaded and used by the operating system when appropriate, it may be firmware, or other types of software forms. In one embodiment, an execution logic is configured to execute the search logic 300 and filter logic 315 as one or more background tasks on the mobile device allowing a user to perform other tasks concurrently. The execution logic can be part of an operating system, part of the search logic, or both, or a separate piece of software.

With one or more detected devices displayed to the user, the user can select a desired device to process a print request or other type of job request. It will be appreciated that the search logic 300 can be configured to discover and filter devices based on a particular type of job request. For example, if the job request is related to printing a photograph, the search logic would be configured to filter detected devices based on their imaging capabilities. If the job request related to faxing a document, the search logic would be configured to discover and filter detected devices that had facsimile capabilities. Other examples will be appreciated by those of ordinary skill in the art.

Figure 4:
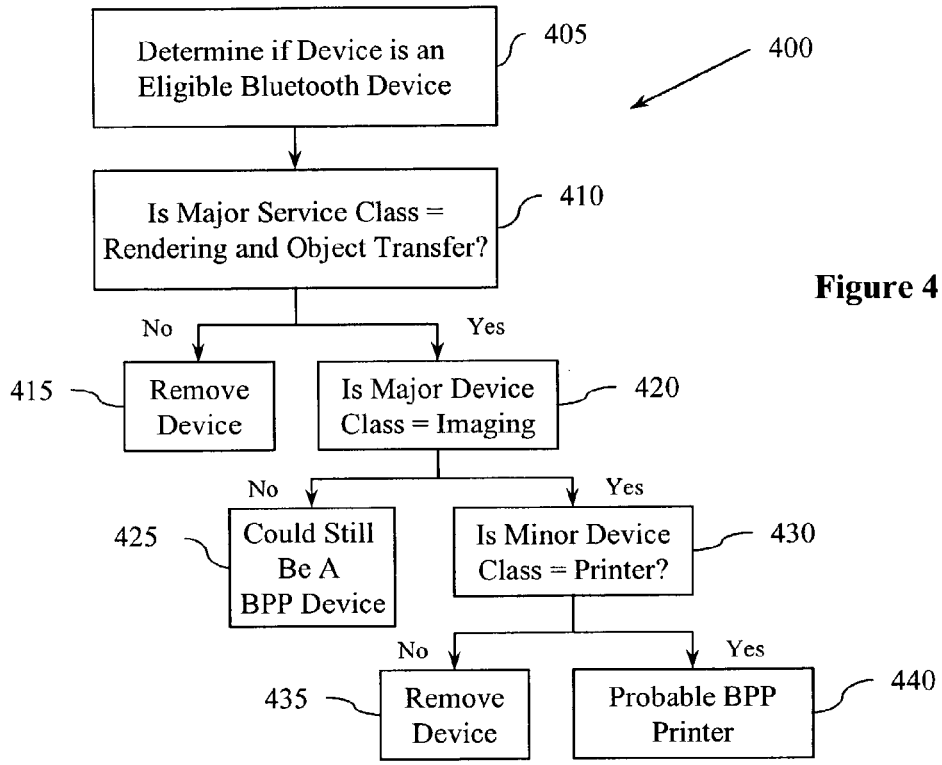
FIG. 4 is one embodiment of a decision tree that determines a devices type based on Bluetooth protocol.

Illustrated in FIG. 4 is one embodiment of a decision tree that can be used to filter detected devices during a search. The decision tree 400 is based on the Bluetooth protocol and interrogates the class of device/service parameters. As mentioned previously, the class of device/service parameters, at the time of filing of the present application, includes assigned numbers for major device classes, minor device classes, and major service classes. An example the parameters are shown in FIG. 8.

During the inquiry stage of the search, it is determined if a device is an eligible Bluetooth device (block 405). This can be simply determined by whether or not an acknowledgement signal is sent back in response to an inquiry signal. The Bluetooth device can also transmit the class of device/service parameter data indicating its assigned values for the major device class, the minor device class, and/or the service class. Data relating to the service capabilities or service class of a device, whether major or minor, will be referred to as "service class data." If the search is filtering for imaging devices, it can then determine if the major service class of a detected device includes "rendering" and "object transfer" capabilities (block 410).

If the service class data does not indicate these capabilities, the device is removed or otherwise not included in a list of eligible devices (block 415). If the device includes these capabilities, the major device class is then checked to determine whether it is an "imaging" device (block 420). If it is not an imaging device, the device could still support basic printing (e.g. a BPP device). Since that capability is not determinable, the device can be added to list of eligible imaging devices but with a low relevance ranking. If the device is an imaging device, the tree moves to block 430 where the minor device class is checked. If the minor device class is not a "printer," the device is removed (block 435). If the minor class is a "printer," the device is identified as a probable BPP printer and included in the list of eligible devices (block 440).

Figure 5:
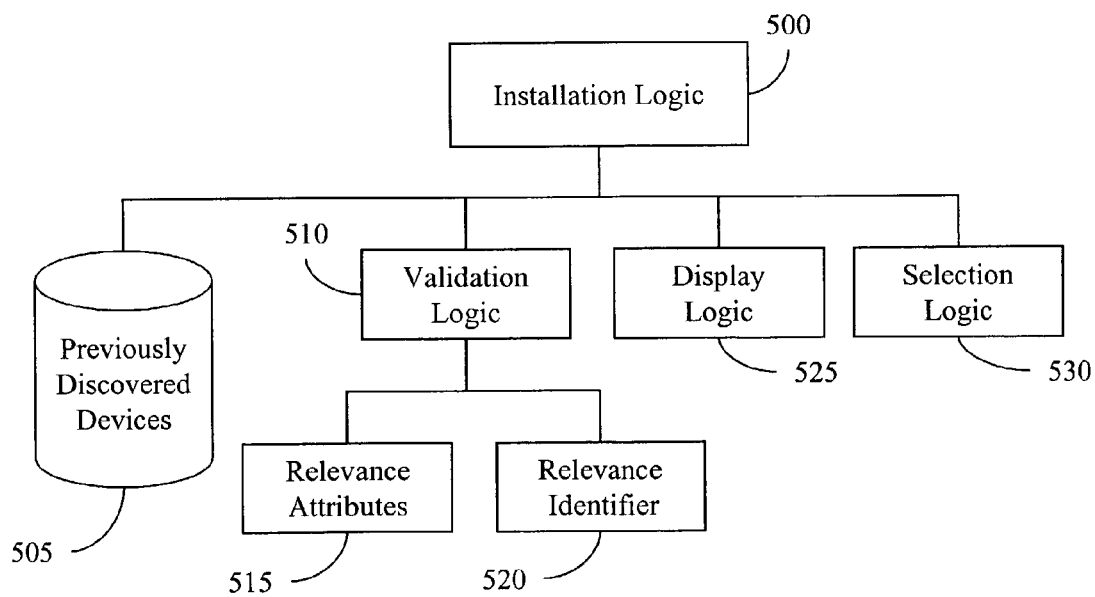
FIG. 5 is one embodiment of an installation logic for installing previously discovered devices.

Illustrated in FIG. 5 is one embodiment of a system that stores information of eligible devices discovered during the background search and automatically installs eligible server devices for use in a subsequent search. For example, saving information of discovered devices that have been previously determined to be eligible printing devices, may speed up the process of searching for the same device in the future. In that regard, an installation logic 500 may be provided in the mobile device 100 that communicates with the asynchronous search logic 130 or 300.

Once a discovered device is determined to be an eligible imaging device, identifiers and/or attributes of the device are stored in a data structure of previously discovered devices 505. The data structure may be embodied as one or more databases, tables, text files, linked lists, or other desired data structure and stored in a computer-readable medium. Examples of information that can be stored for a device include a device address, name, identifier, and other parameters that can be retrieved during discovery such as the device class and service class. These types of attributes are generally static attributes since they do not frequently change once they are assigned to a device Other types of dynamic attributes can be generated and stored for each device. These may include a time stamp that identifies a time/date of when the device was discovered. As will be described in greater detail below, a device's time stamp may affect its relevance as an eligible server device for a future job request. For example, if a device was discovered six months ago, the probability of that device still being within the communication range is probably low. Thus, the relevance of that device being an eligible server device is also probably low. The relevance may change, of course, if a current search discovers the device within range.

Another device attribute may be location information of the discovered device. The location of a server device with respect to the location of the mobile device (client device) may factor into the server device's relevance. If the location of the server device is known, the location would be compared to the location of the mobile device to determine the distance between the two. The mobile device, in this embodiment may include a positioning logic such as a global positioning system receiver (GPS), an assisted global positioning system (AGPS), or other location identifying system. Other attributes may include unique names or identification numbers of a device which can assist the system in identifying a discovered device in a subsequent search.

To determine the relevance of the previously discovered devices 505, a validation logic 510 is configured to analyze and validate the device attributes and generate a relevance score for each device. From the device attributes stored in the data structure 505, the validation logic 510 can be configured to analyze selected attributes and use them as relevance attributes 515 for the determination.

In one embodiment, the time stamp attribute can be a relevance attribute 515 that is compared to the current time of a search. As previously mentioned, the time stamp reflects the time when the corresponding device was initially discovered. Thus, the relevance of a server device can be increased or decreased based on how long ago it was discovered. For example, if a server device has a time stamp that is 30 minutes from the current time, its relevance would be much greater than the relevance of a server device having a time stamp of six months ago.

Another relevance attribute 515 may be the location of a server device. Since most wireless protocols have a limited communication range (e.g. about a 10 meter range for Bluetooth imaging devices), a device's relevance can depend on whether it is still within the range. As mentioned previously, the range or distance between a server device and the mobile device can be determined from the location of the mobile device with respect to the location of the server device. If the server device is within the communication range, the device would get a higher relevance score than a device that was outside the communication range. This assumes that such location information is available for the mobile device such as by using the global positioning system (GPS or AGPS).

In another embodiment, the validation logic 510 can be configured to pre-select server devices from the previously discovered devices 505 based on location information. For example, if the logic knows the location or approximate location of the mobile device, e.g. Chicago area, the logic can select only server devices that are in the Chicago area and perform a relevance determination on them. This avoids processing devices that are not in the area and provides a more relevant list of server devices to the user.

A unique name or identification (ID) of a server device may also be used to determine its relevance. For example, during a current search, if a unique name or ID of a discovered device matches the unique name or ID from a previously discovered device 505, its relevance score would increase. Furthermore, since such a device had been previously discovered and filtered as an eligible imaging device, the current search could avoid performing the additional steps of service discovery or otherwise determining the device's capabilities because those steps were performed during a previous search. Thus, this could speed up the search process.

With further reference to FIG. 5, a relevance identifier 520 can be generated for each of the previously discovered devices 505 indicating the relevance of each. For example, the relevance identifier 520 may be a relevance score based on a predefined range such as 0-10, 0-100, or other ranges where a higher score indicates a higher relevance or vise versa. The relevance score could also be in the form of a percentage. Other types of relevance identifiers could include icons or other graphical indicators that can be associated with a device name. When displayed to a user, the icon could represent the relevance of a device and distinguish highly relevant devices from lower relevant devices. Other types of graphical indicators could include displaying server device names using different colors for different relevance scores. The validation logic 510 can also be configured to generate a sorted list of devices based on each device's relevance. In this manner, the sorted list acts as the identifier.

A display logic 525 can be configured to display the names of previous discovered devices and their associated relevance identifier 520 to a user. Once the list is displayed, a selection logic 530 may be included that allows a user to select a particular device from the displayed list indicating the user's preference. If a discovery search is still in progress, the search can be stopped once the selected device has been discovered without having to discover all devices within the area.

In another embodiment, the installation logic 500 can be configured to store usage information for each of the previously discovered devices 505. For example, each time a server device is used or selected for a job request, a usage count can be incremented. This can be part of the selection logic 530. In this manner, the mobile device can try to learn and determine a user's preferences for devices. A server device that has been used more often in the past, would receive a higher relevance score. Furthermore, by combining usage information and location information, the installation logic 500 can generate a more relevant and meaningful list of server devices for the user to select from.

For example, suppose an imaging device (ID=XYZ1) located within building 123 in Boise, Id. has been previously discovered and stored in the data structure 505. Further suppose that the attributes for XYZ1 show that it has a usage count that is greater than other devices, meaning that XYZ1 has been used by the mobile device more frequently than any other device. When the installation logic 500 performs a validation and installation of eligible server devices, device XYZ1 would obtain a very high relevance score and be displayed as a preferred device to the user whenever the mobile device is in the same location, e.g. building 123 in Boise. Other server devices, if any, in the area that have lower usage counts would be assigned a lower relevance.

Illustrated in FIG. 6 is one embodiment of an installation methodology 600. The device attributes from the list of previously detected devices are read (block 605). Selected attributes are then analyzed to validate each previously discovered device (block 610). Based on the device attributes, a relevance is determined for each device based on, for example, its time stamp, its location, its user name, its usage information or other selected attributes (block 615). A list of devices can then be displayed based on their relevance and/or showing a relevance score, and allowing a user to select a device from the list (block 620).

With reference to FIG. 7, one embodiment of a user selection process is shown. This process can be part of the installation process where the user selects a device from the displayed list of previously discovered devices. The process is initiated once a selection is detected from the displayed list of previous devices (block 705). If a search has not initiated yet, a search for the selected device is then initiated (block 710). If a search is already in progress, and the search discovers a device that matches the selected device, determining the discovered device's capabilities can be skipped (block 715). The search can then be stopped (block 720) since the capabilities of that device have been previously determined and validated.

Suitable software for implementing the various components of the present system and method using the teachings presented here include programming languages and tools such as Java, C#, C++, C, CGI, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software or logic, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein may be implemented as separate components or may be combined together.

With reference again to FIG. 1, the following describes one embodiment of the wireless transceiver logic 145 configured and operating according to the Bluetooth specification. A detailed description of this specification can be found on the Internet at www.bluetooth.org. Of course, it will be appreciated by those skilled in the art that the Bluetooth specification may change in the future. Thus, the present system can be modifiable to meet future communication requirements and/or standards.

Based on the Bluetooth specification, the transceiver logic 145 can include a Bluetooth PICO Net (BPN) antenna which couples the mobile device 100 through a wireless network. The BPN antenna is a circular polarization antenna which has a consistent transmission/reception sensitivity in every direction, with non-directional properties, or an antenna capable of radiating a plurality of polarized waves. The transceiver 145 may also be a radio, but could also be any other RF transceiver having a low power transmitter capable of short distance transmissions (e.g. less than 100 meters).

Figure 9:
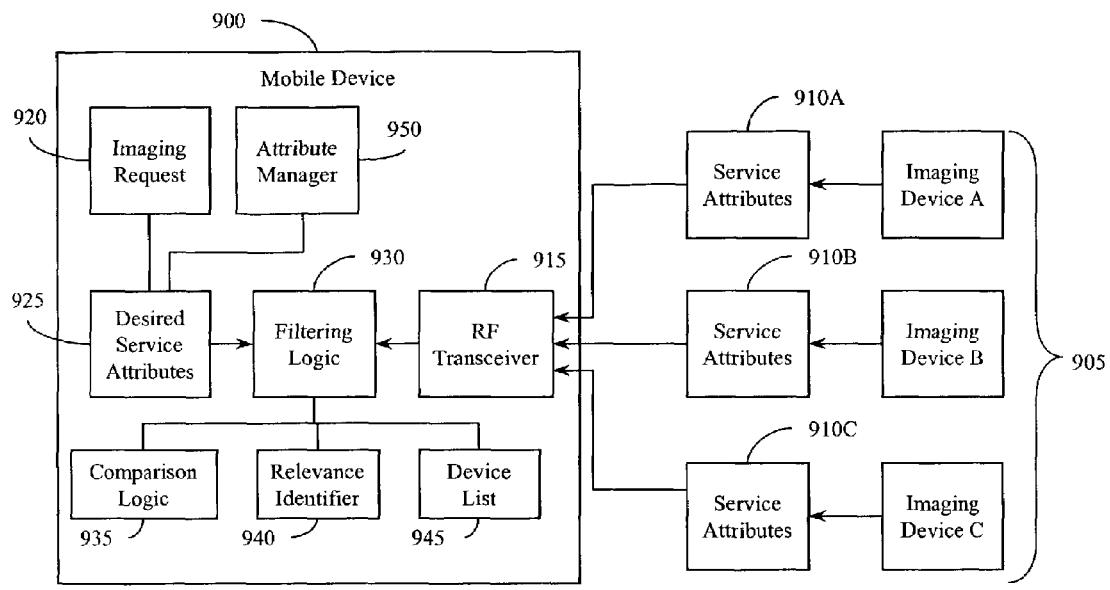
FIG. 9 is another embodiment of a filtering system for a mobile device.

Illustrated in FIG. 9 is one embodiment of a system for filtering discovered wireless devices based on how well their functional capabilities match one or more desired capabilities for a job request. Although the following example will be described with reference to Bluetooth-enabled imaging devices (server devices), it will be appreciated that other types of electronic devices can be used as well as other types of wireless communication protocols. In one embodiment, the example will also describe a mobile device 900 as being a camera-enabled mobile phone (client device) although other types of mobile devices can be used as described previously. It will be appreciated that the components shown in the mobile device 900 may also include some or all of the components shown in the embodiment of FIG. 1, or other components depending on the type of mobile device implemented.

During or after a search to discover available server devices (e.g. Bluetooth-enabled imaging devices), the discovered imaging devices can be filtered and/or prioritized based on their capabilities. A user of the mobile device 900 may require extended information about each discovered device's capabilities so that the user may select an appropriate device to process a job request. For example, assume that three image forming devices 905 have been discovered during a search which include imaging device A, B, and C. Each imaging device A-C may include one or more pre-defined service attributes 910A-C, respectively, that represent the imaging capabilities of the imaging device. The service attributes 910 may be transmitted to the mobile device 900 in response to a request for such attributes or may be automatically transmitted during discovery. In one embodiment, communication is performed through a radio frequency (RF) transceiver 915 which communicates to a compatible RF transceiver (not shown) connected to each imaging device 905. The RF transceiver 915 may be configured similarly to the wireless transceiver logic 145 shown in FIG. 1.

When a user wishes to print an image, for example a photograph from a camera, an imaging request 920 is generated. One or more desired service attributes 925 can be defined for the imaging request 920 that indicate imaging capabilities desired for processing the imaging request 920. The desired service attributes 925 may include preferred attributes, required attributes, upper and/or lower limits for values, range values, or other types of data that represent imaging capabilities. Examples of service attributes may include values for color, double-sided printing, print speed, print cost, print quality, type of security, type of print media, data format, location of printer, and other types of attributes. As the imaging devices 905 are found during the discovery search or after the search is complete, each device's capabilities can be matched or otherwise compared against the desired service attributes 925.

To perform the comparison and to determine which imaging devices are most appropriate for the imaging request 920, a filtering logic 930 is provided. For example, a comparison logic 935 may be configured to compare the values of the desired service attributes 925 with their corresponding values from the service attributes 910A-C to determine which of the imaging devices 905 are relevant for processing the imaging request 920. Based on how well the service attributes 910 match with the desired service attributes 925, a relevance identifier 940 can be generated for each of the imaging devices 905. The relevance identifier 940 may include, for example, a score, a percentage value, or other type of relevance indicator such as those described with the relevance identifier shown in FIG. 5.

Many different types of scoring algorithms can be programmed with the comparison logic 935 to determine the relevance of an imaging device. For example, if the desired service attributes 925 includes one or more required attributes and an imaging device does not have the capability of a required attribute, the relevance of that imaging device would become very low. Different relevance weights could also be applied to certain desired service attributes 925 based on what a user indicates as important for an imaging request 920. For example, if the imaging request 920 is for printing a photograph, color may be a required service attribute. However, a user may indicate that color is optional, thus the relevance of a non-color printer would be less impacted.

As another example, if printing a document with many pages, print speed and double-sided printing may be set as required as attributes. For a traveling user, the cost of a print solution may be a deciding factor in selecting an imaging device to process the imaging request 920. Another type of user may be concerned with the security and location of the imaging device and may indicate these attributes with specific values as a requirement. Other types of attributes may have values that may have upper and/or lower limits on them to indicate user preferences. For example, one service attribute may be "print speed" that may be set with a value having a range or a limit such as at least ten pages per minute. As such, an imaging device that has a print speed of five pages per minute would receive a lower relevance than a device which satisfied the print speed criteria.

As the relevance of each discovered imaging device 905 is determined, a device list 945 can be generated and/or updated showing each discovered imaging device and their relevance to the current imaging request 920. The device list 945 may be a prioritized or sorted list that displays each device from highest to lowest relevance. Of course, the device list 945 can be displayed in other ways such as alphabetically by device name, color coded by relevance, by relevance score, or by another desired way. From the device list 945, a user can then select one of the available imaging devices. This would cause the RF transceiver 915 to establish a communication link with the selected imaging device and the imaging request could be transmitted for processing.

With further reference to FIG. 9, the mobile device 900 may include an attribute manager 950 that includes logic to allow a user to define and set values for the desired service attributes 925 for an imaging request. The attributes can be defined separately for each imaging request generated and/or a default set of desired attributes may be defined which are applied to each imaging request unless a user specifies otherwise. The attribute manager 950 may include a predefined set of attributes. When defining desired attributes for a print request or as a default set, the attribute manager 950 can present the attributes to a user for selection and/or modification through a menu or dialog box. The user can then set and modify values for each attribute. In one embodiment using a standardized set of attributes for a selected communication protocol, each device using that protocol can be configured to have the same selectable standardized attributes. Thus, when determining the characteristics of a device, a comparison between desired attributes and the attributes of another device may be easily performed since corresponding attributes will exist. In other embodiment, the attribute manager 950 may also allow a user to define one or more new desired service attributes.

As the availability and number of wireless-enabled imaging devices increases, a user of the mobile device 900 may become more likely to encounter these devices and to encounter more than one during a discovery search. By filtering the discovered devices based on user-specified preferences and attributes, the discovered devices may be displayed as a prioritized list allowing the user to more easily select a desired imaging device.

Figure 10:
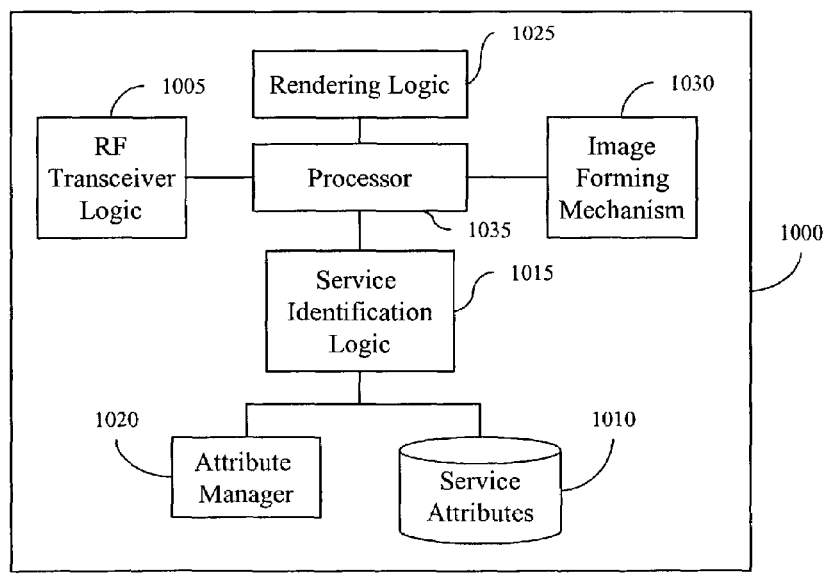
FIG. 10 is one embodiment of a wireless enabled image forming device with a service identification system.

Illustrated in FIG. 10 is one embodiment of an image forming device 1000 that includes a compatible RF transceiver logic 1005 configured to communicate with the RF transceiver 915 shown in FIG. 9. The image forming device 1000 is configured to include one or more service attributes 1010 that represent the capabilities of the image forming device. The service attributes 1010 may be stored in one or more data structures such as a table, an array, a list, a file, and stored in memory or other type of computer-readable medium. The service attributes 1010 can be transmitted to a mobile device automatically or in response to a request. The attributes may allow the mobile device to better determine whether the imaging forming device 1000 can process an imaging request in accordance with specific preferences.

A service identification logic 1015 may be included that is configured to generate and/or modify the service attributes 1010. In that regard, an attribute manager 1020 may be provided that includes an interface for inputting and setting values for the service attributes 1010. For example, the interface may be a display panel, a control panel, a software dialog box, or other input means. In another embodiment, the service identification logic 1015 can be configured to load the service attributes 1010 into the image forming device 1000 from an external device such as a computer. For example, the computer may include software to set values for the service attributes of the image forming device 1000 and then transmit the values, causing them to be loaded into the service attributes data structure 1010. Thus, when the image forming device 1000 responds to a discovery request from a mobile device, the RF transceiver logic 1005 can transmit the service attributes 1010 to the mobile device. This allows the mobile device to better determine the capabilities of the image forming device 1000 prior to transmitting an imaging request.

Additionally, the image forming device 1000 may include rendering logic 1025 configured to generate a print-ready image from an imaging request. Rendering varies based on the format of the data involved and the type of imaging device. In general, the rendering logic 1025 converts a high-level object-based description (e.g. the imaging request) into a graphical image for display or printing (e.g. the print-ready image). For example, one form is ray-tracing that takes a mathematical model of a three-dimensional object or scene and converts it into a bitmap image. Another example is the process of converting HTML into an image for display/printing.

The image forming device 1000 further includes an image forming mechanism 1030 configured to generate an image onto print media from the print-ready image. The image forming mechanism 1030 will vary based on the type of imaging device and may include a laser imaging mechanism, other toner-based imaging mechanisms, an ink jet mechanism, digital imaging mechanism, or other imaging reproduction engine. A processor 1035 may be included that is implemented with logic to control the operation of the image-forming device 1000. In one embodiment, the processor 1035 includes logic that is capable of executing Java instructions. Other components of the image forming device 1000 are not described here but may include media handling and storage mechanisms, sensors, controllers, and other components involved in the imaging process.

Illustrated in FIG. 11 is one embodiment of a methodology to filter discovered devices based on their capabilities. As mentioned previously, filtering based on capabilities may occur during or after the discovery for wireless-enabled devices is completed (block 1105). Initially, when a wireless device is discovered, it may include devices that are irrelevant to a current job request. For example, if the job request is an imaging request that requires an imaging device, a discovered cell phone will not be appropriate. Thus, a discovered device can be identified and filtered based on the type of device and/or service information that is provided by the discovered device (block 1110).

In one embodiment using the Bluetooth communication protocol, the Bluetooth specification identifies class of devices and service classes that enable the initial identification and filtering to be performed. This allows the mobile device to identify whether or not a discovered device is an imaging device, or another type of device that is desired. From the identified imaging devices, they may be further filtered based on their imaging capabilities (e.g. service attributes) (block 1115). It will be appreciated that filtering does not necessarily mean removing devices, but includes changing the relevance or priority of a device.

The relevance of an imaging device's capabilities would depend on how its capabilities matched one or more desired service attributes associated with an imaging request. The filtered imaging devices can then displayed for selection based on their relevance (block 1120). As such, if an imaging device's capabilities more closely match the one or more desired service attributes for an imaging request, the relevance of the imaging device increases. A user may then select from the displayed list of imaging devices and the imaging request would be transmitted to the selected imaging device for processing.

With reference to FIG. 12, another embodiment of the filtering step 1115 is shown. For example, a mobile device may request service capabilities to be transmitted from each discovered imaging device (block 1205). The service capabilities of the imaging device are then compared to one or more desired service capabilities of the imaging request (block 1210). Based on the comparison, a relevance is generated for each image-forming device (block 1215). Service capabilities that comply with preferences and/or requirements of the desired service capabilities, to a greater degree, will increase the relevance. A list of the image-forming devices is then generated based on their relevance such that a user may select a desired imaging device to process the imaging request (block 1220).

With this type of service attribute based filtering, selecting discovered devices can be made easier for a user by trying to determine and display the most relevant devices. Identifying a highly relevant server device in advance may avoid a situation where a user transmits a job request to an inappropriate server device only to later find that the request cannot be processed because the selected device does not have the appropriate functional capabilities. In another case, the job request could be processed but the result is not what the user expected. In both situations, the user may lose time and/or costs and may become frustrated.

Figure 13:
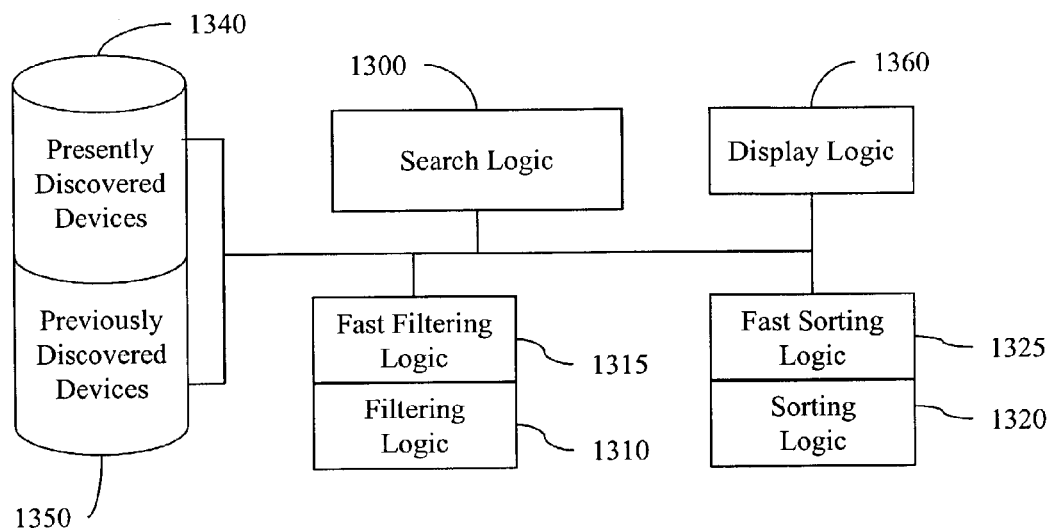
FIG. 13 is one embodiment of a search logic.

Referring now to FIG. 13, another embodiment of a search logic 1300 is illustrated that may include filtering logic 1310, and fast filtering logic 1315; sorting logic 1320 and fast sorting logic 1325; and data storage units 1340, 1350. In the illustrated embodiment, while a search is in progress, the search logic 1300 attempts to identify compatible wireless devices, also referred to as compatible components, that are within a communication range. In one form, a first data structure or storage 1340 is populated with data received from and corresponding to compatible wireless devices responding to the search. As noted, such data can include device identification numbers, names, capabilities, distance, location, status and the like. Fast filtering logic 1315 is configured to compare attributes or characteristics of the presently found devices contained in data structure 1340 with attributes or characteristics of previously found devices stored in a second data structure 1350.

For example, assuming a first data item transferred from a server device to a client included a unique name or number. Upon receipt of this first data, the fast filtering logic 1315, compares this unique name or number to a like field in the listing of complete or substantially complete attribute information in the second, or historical data structure 1350. Depending on a match or a likely match, the fast filtering logic 1315 can filter or influence the arrangement and display of individual device representations, such as icons, text listings, graphical tokens and the like before complete information about the responding device is transmitted over the wireless communication link. Such filtering can comprise excluding the entry from display, or otherwise making selection of a particular entry impossible or difficult. Such filtering may be appropriate where a print request requires rendering and printing, but the device responding to the search lacks these capabilities.

In an alternate embodiment also illustrated by reference to FIG. 13, fast sorting logic 1325 is configured to compare attributes or characteristics of the presently found devices with attributes or characteristics of previously found devices stored in the second data structure 1350. Again, assume a first data item transferred from a server device to a client includes a unique name or number. Upon receipt of this first data, the fast sorting logic 1325 compares this unique name or number to a like field in the attribute information in the historical data structure 1350. Depending on a match or a likely match, the fast sorting logic 1325 can sort or influence the arrangement and display of individual device representations, such as icons, text listings, graphical tokens and the like before responding device attribute characteristics are received over the wireless communication link. Such sorting can include advancing more likely selections toward the top of a display list, highlighting favorites or previously used devices, changing colors or shading associated with certain representation and the like.

Where only some entries are found in the historical data structure 1350, or where no entries are found in the historical data structure 1350, the previously discovered devices, if any, are filtered by the fast filtering logic 1315, sorted by the fast sorting logic 1325, or both. The newly found devices are processed by filtering logic 1310, sorting logic 1320, or both as data arrives. In this case, display is controlled and dynamically updated as device attributes become available over the wireless network and are stored in the first data structure 1340. Dynamic updates may occur as new data arrives, at determined intervals, or combinations thereof. From the first data structure 1340, filtering logic 1310, sorting logic 1320, or both, apply their respective algorithms and control the display accordingly.

Those skilled in the art can now appreciate that alternate embodiments are readily obtainable. For example, while first data structure 1340 and second data structure 1350, are illustrated as separate, but connected devices, they could alternately reside on the same physical device segregated by address, partitioned, or otherwise identifiable to the logic accessing them. The illustrated logic, represented as distinct components, can be configured together or separated with no loss of functionality. Further, various logical distinctions have been illustrated for clarity but actually need not be so distinct.

Figure 14:
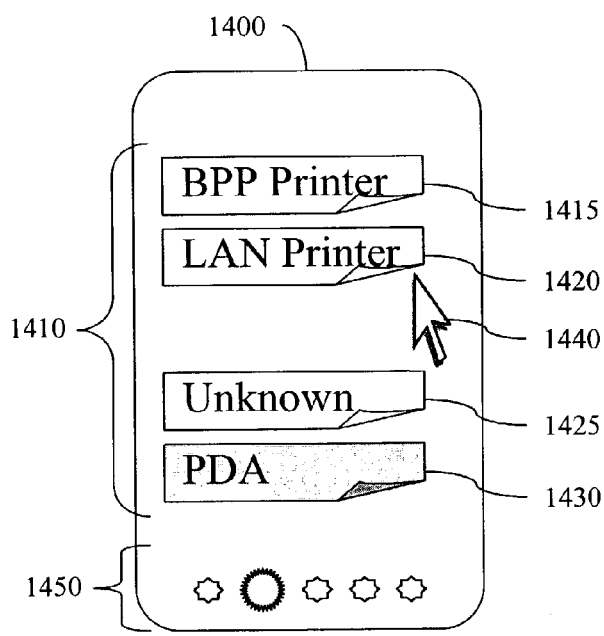
FIG. 14 is one embodiment of a display.

With reference now to FIG. 14, a display 1400, for example on a mobile phone, includes a selection of icons 1415, 1420, 1425, 1430, a selection icon 1440, and a status section 1450. As illustrated, icon 1415 is a graphical representation of a device sorted to the most relevant or top position on the display 1400. A second device 1420 has been determined to be a likely selection for the print request, but has been sorted to a secondary position. The sorting can occur based on a variety of factors including user selection, prior success or selection of that device, a naming convention, capabilities of discovered device, filter results, ability to accept a new job and the like.

In one aspect illustrated by FIG. 14, icons 1415 and 1420 were previously discovered devices and were re-identified as discussed above upon commencement of the search. Accordingly, the fast filtering and fast sorting logic 1315, 1325 (FIG. 13) can arrange for selection or display of these currently available devices that were previously discovered. Icon 1425 illustrates one display possibility for a responding device before identifying data is obtained, perhaps due to a first encounter with this particular device. Filtering logic keeps the icon selectable until more information is obtained, while sorting logic places it below known good candidate devices and above disabled selections. Icon 1430 represents a remote device known to not have capabilities suitable for the present application. In the illustration, selection of icon 1430 is inhibited and is represented to a user by filling the icon with gray.

As additional data is obtained through the search process, the filtering logic, the sorting logic, or both can continue to update the display while data is received. Another benefit of this embodiment is that the changing display advises a user that the search and selection process is underway or not yet completed, preventing premature selection of, perhaps, a less than ideal device. Another indication of continued updating illustrated by FIG. 14, includes a changing status area 1450. As illustrated, one of a set of lights selectively illuminates at an interval while data continues to be received or the process continues to operate normally. Other examples of status indicators include bars, clocks, hourglasses and the like.

Figure 15:
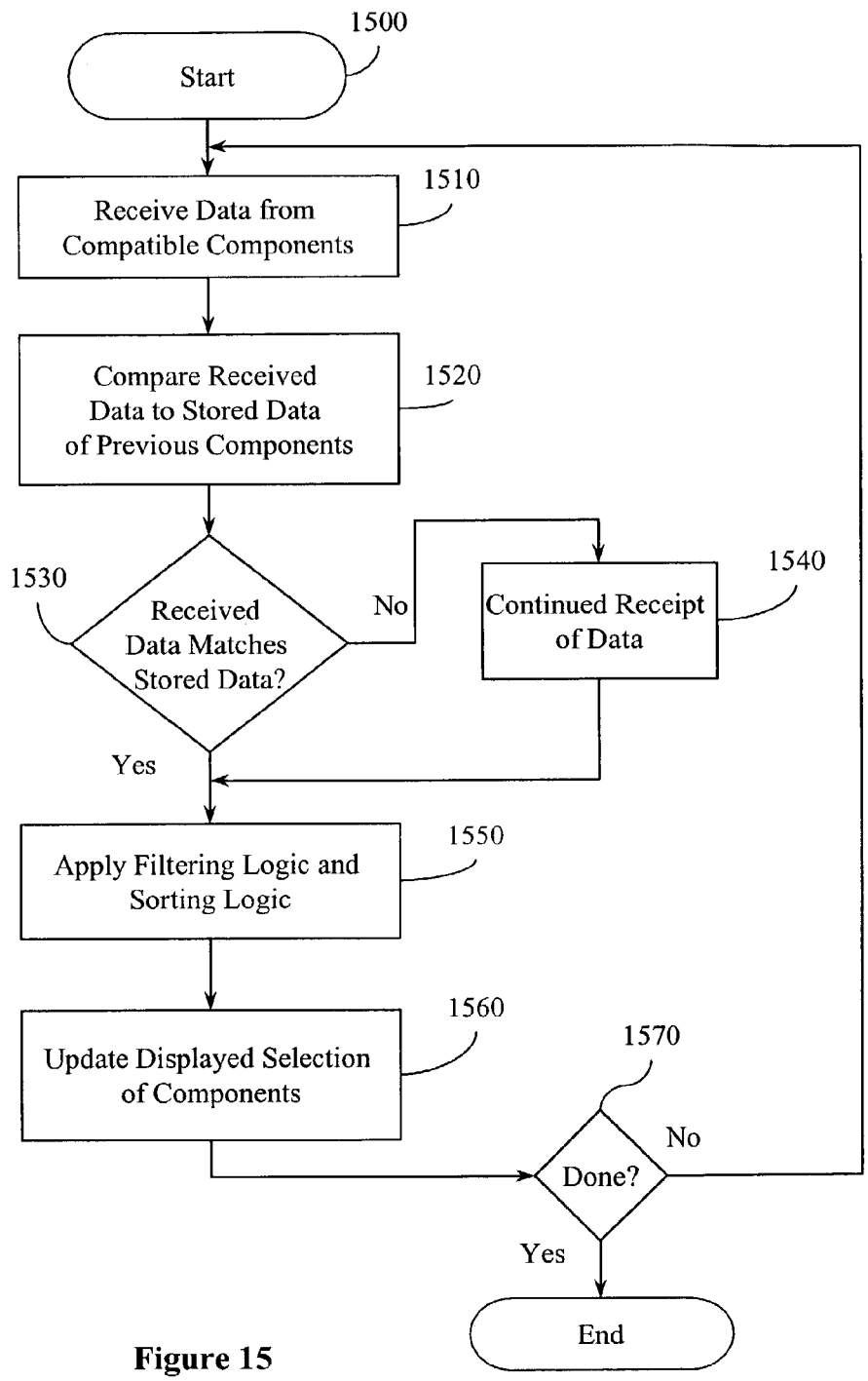
FIG. 15 is one embodiment of a display methodology.

With reference now to FIG. 15, one embodiment of a methodology, or algorithm is illustrated. After selection process is begun (block 1500), data begins to be received from compatible components (block 1510). At this point, a status indicator may optionally be advanced or otherwise updated to reflect receipt of data or at least continued search operations. The received data is compared to a list of previously stored attributes or characteristics of devices found (block 1520). If the decision depicted by block 1530 regarding a match of previous data with presently received data is not successful, the methodology branches to receive more data (block 1540). From there or, if the decision in block 1530 is successful, the methodology applies filtering logic, sorting logic or both to the received data (block 1550). The display is updated to reflect the present status of devices known, and the process loops back for more data until complete (block 1570).

Figure 16:
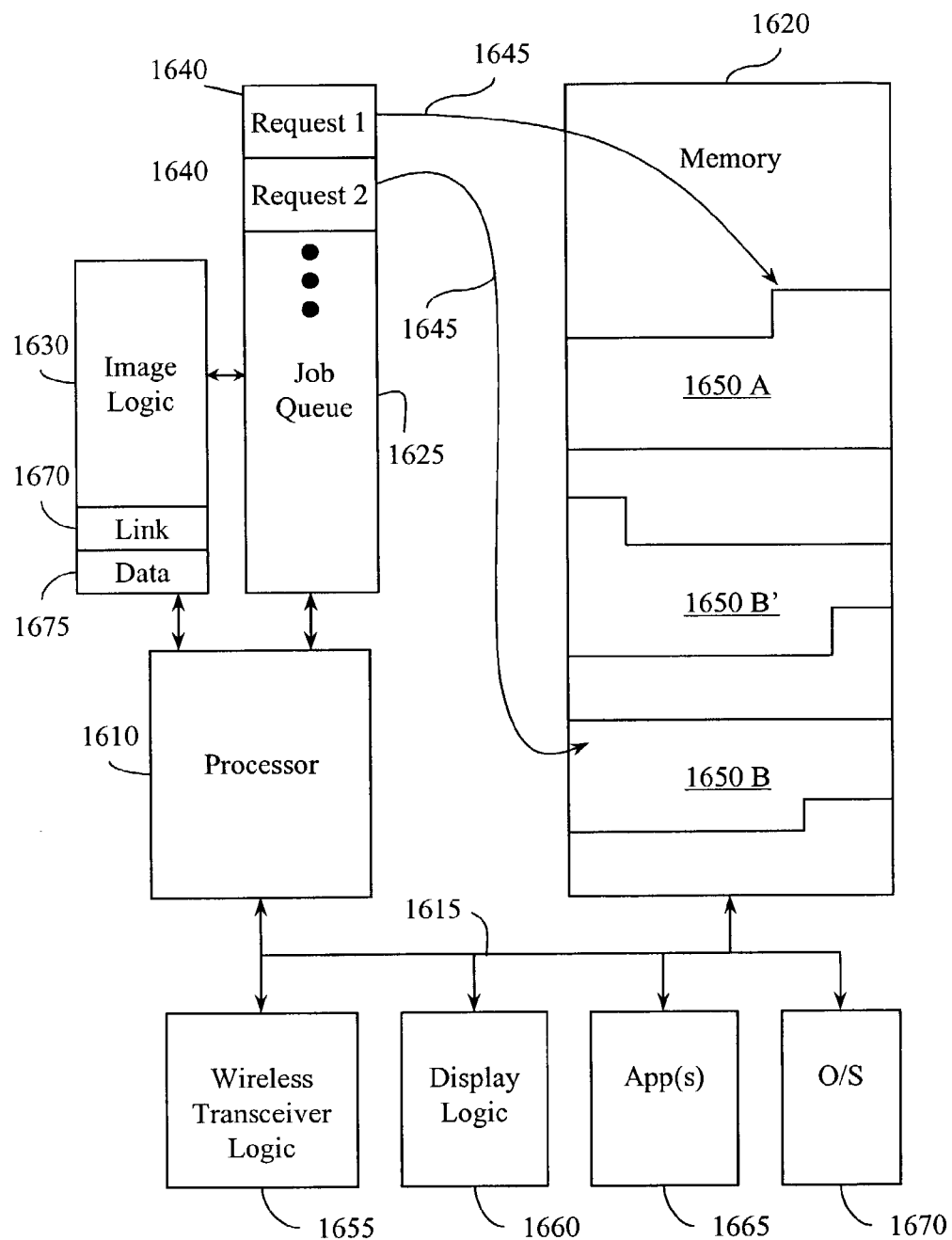
FIG. 16 is one embodiment of a wireless mobile device.

With reference now to FIG. 16, one embodiment of a mobile device is shown that is configured to accept user print job requests and process multiple simultaneous print jobs. In other words, a system is provided that is capable of receiving user requests for print jobs while other print jobs are being processed concurrently. The mobile device includes a processor 1610 in communication over a data bus 1615 with a storage, memory, or other computer-readable medium 1620. A job queue 1625, in data communication with the processor 1610 and controlled by imaging control logic 1630, maintains print requests 1640. When a request from a user is received to print one or more image data, the imaging control logic 1630 places a print request/job into the job queue 1625 and stores reference data or information 1645 with the request. The reference data 1645 identifies the corresponding image data 1650 that is to be printed with the print request. The reference data 1645 may include one or more addresses, pointers, lists of locations, or other type of identification data that allows the corresponding image data to be located and retrieved from a memory or storage 1620 when the print request is processed. Additionally, the processor 1610 communicates with other components over data bus 1615 including, without limitation, the following: wireless transceiver logic 1655, display logic 1660, other applications 1665, and operating system 1670.

In one embodiment, an application 1665 initiates a job request or provides a triggering event as previously discussed above. Processor 1610 spawns imaging control logic 1630, and reserves a portion of memory to serve as the job queue 1625. It should be apparent that other configurations such as dedicated a control logic and job queue or both can be implemented without reducing functionality. Imaging control logic 1630 creates a first request 1640 and queues first request data such as an address location in memory, job title, or other data usable to locate the image data in memory 1620. Using the information in the queue 1625, the processor 1610 transmits the image data to an imaging device (not shown) using the wireless transmission logic 1655.

In one embodiment, the stored image data 1650A is formatted in a non-imaging ready format also referred to as a non-rendered format. The non-imaging ready format may be useful for compression, display, or both, but as used herein is defined to need further rendering or processing prior to imaging such as hard copy printing or transmission via facsimile. Those skilled will appreciate that suitable non-imaging ready formats presently exist in the JPEG family of formats, XHTML, Serial Port Protocol and the like. In this embodiment, non-imaging ready formatted data can be displayed on the device, and transmitted to an imaging device capable of performing the needed processing to place the data in print ready format.

In another embodiment, transmitting the non-imaging ready formatted data permits memory and processing savings by reducing a need to make copies of the imaging data for on-device rendering or other manipulation. Further savings can be realized by transmitting the non-imaging ready formatted data directly from memory without copying whole image or large image components into the queue. Further, the size of the queue is minimized to contain only a small amount of data indicating the reference data such as address, memory location, or other identifying information relating to the image data.

In another embodiment, an application 1665 initiates an imaging command for an image format incompatible for printing with the desired or selected wireless server device, as illustrated by 1650B'. Here, processor 1610 executes instructions that generate print ready bits, or alternately, that format the incompatible image data to the intermediate data format, illustrated by 1650B. Those skilled can appreciate that the processor may be configured to convert and store large components or the entire image, as indicated by the storage of both 1650B and 1650B'. Differently, the processor may convert sections on the fly as they are transmitted over the wireless network.

In another embodiment, imaging control logic 1630 monitors the status of the imaging job. Monitoring includes both a wireless link status monitor 1670 and a stored image data status monitor 1675. Partly because at least one of the devices in the communication link are mobile, and partly because the communication link is wireless, it is envisioned that occasionally the wireless link may become degraded or inoperative. The wireless link status monitor 1670 monitors the status of the link. For example if an imaging operation, say printing a photograph, is underway or queued up, and the mobile client moves out of communication range from the server or printer, link status monitor 1670 notes the absence of data connectivity and pauses further transfer. If, within a defined time period connectivity is re-established, link status monitor 1670 resumes the print job where it left off. Ability to resume a partially completed job is provided in one embodiment by asynchronous transfer under the producer—consumer paradigm. Alternatively, if connectivity is not reestablished in a certain time period, link status monitor 1670 performs task ending operations such as canceling the job, clearing the queue, and preparing an error notification for the user.

The image data status monitor 1675 monitors the status of the image data. For example if an imaging operation, say printing a photograph, is underway or queued up, and the image data becomes corrupted or is deleted before the operation is completed, image data status monitor 1675 notes the error condition and notifies the user. Alternatively, image data status monitor 1675 can be configured to prevent deletion of the image data while a print job is pending. In one embodiment this aspect is significant due to the presence of only one copy of the image data in the device. That is, if the image data is deleted, any pending imaging application pointing to or using the data is likely to fail. Image data status monitor 1675 also performs task ending or maintenance operations such as canceling the job, clearing the queue, and preparing an error notification for the user.

Figure 17:
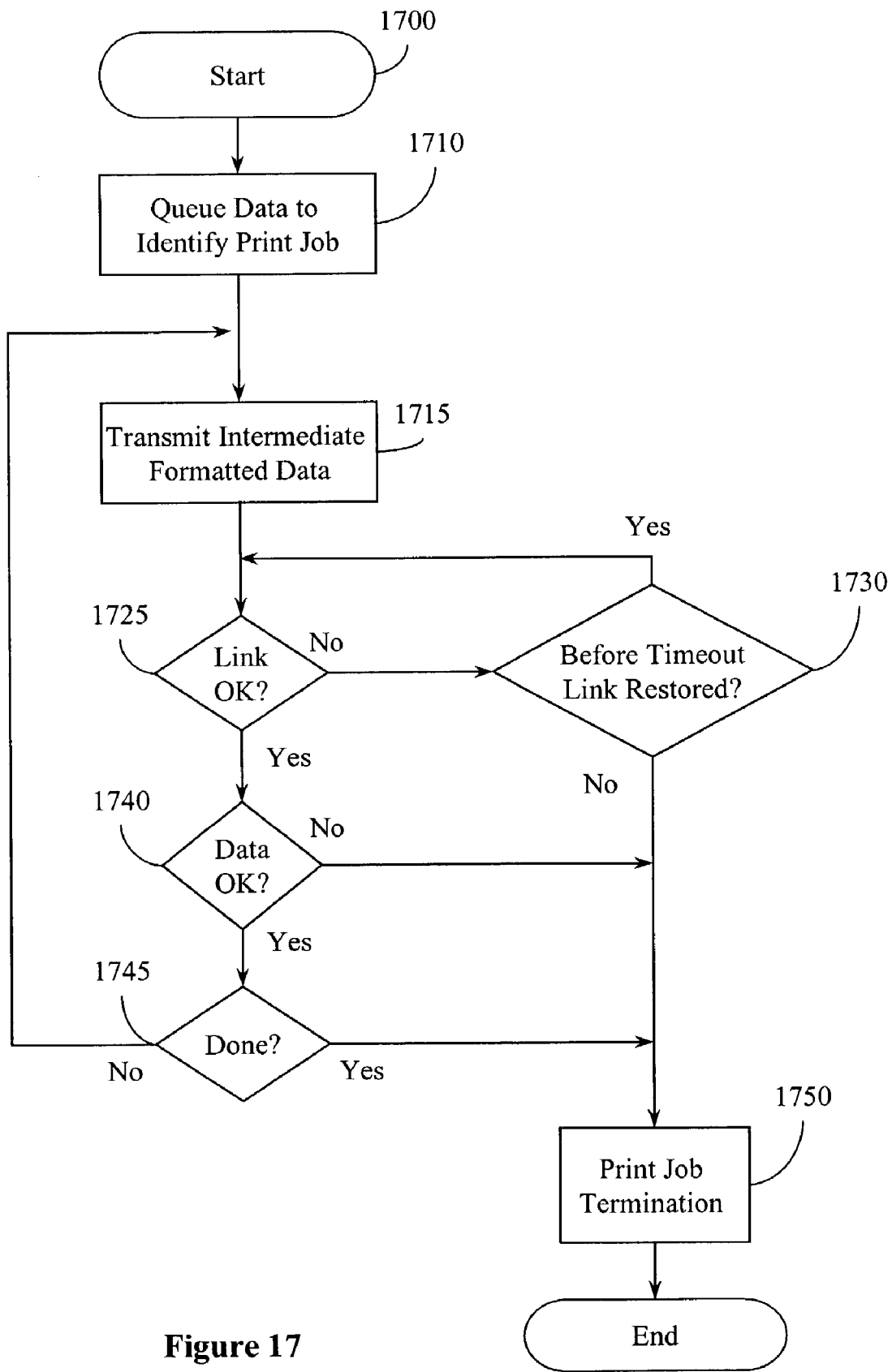
FIG. 17 is one embodiment of a imaging job methodology.

With reference now to FIG. 17, one embodiment of a methodology, or algorithm is illustrated. Upon commencement of a printing job or imaging request (block 1700), data sufficient to identify the stored memory location is queued (block 1710). Indeed, upon initiation of subsequent jobs, further identifying data sufficient to identify the additional memory location is added to the queue, enabling processing simultaneously or seriatim. As appropriate, the stored data is transmitted (block 1715) over a wireless link to a receiving device, for example, a printer. Link integrity is checked (decision block 1725). If the link is degraded or the status is otherwise suspect, a timeout period is commenced during which, should the link be restored, the data transmission is resumed (block 1730). Data integrity is checked (block 1740). If the data has not been compromised, a check for completion is made (block 1745). If the timeout expires before the link is noted to be restored (block 1730); or if the data is corrupted or missing (block 1740), or if the job is complete (block 1745) the print job is terminated, the queue is updated, and residual tracking or monitoring data is deleted or cleaned-up (block 1750). It is now apparent that neither the precise order of methodology nor the inclusion of all the components discussed above are required in every case. Instead, the illustration described above is exemplary in nature intended to describe but one embodiment. Further, the function provided by the blocks above may be implemented in a variety of different ways. For example, implementation as processor executable instructions, software, logic or combinations thereof are envisioned and within the scope of the invention.

Figure 18:
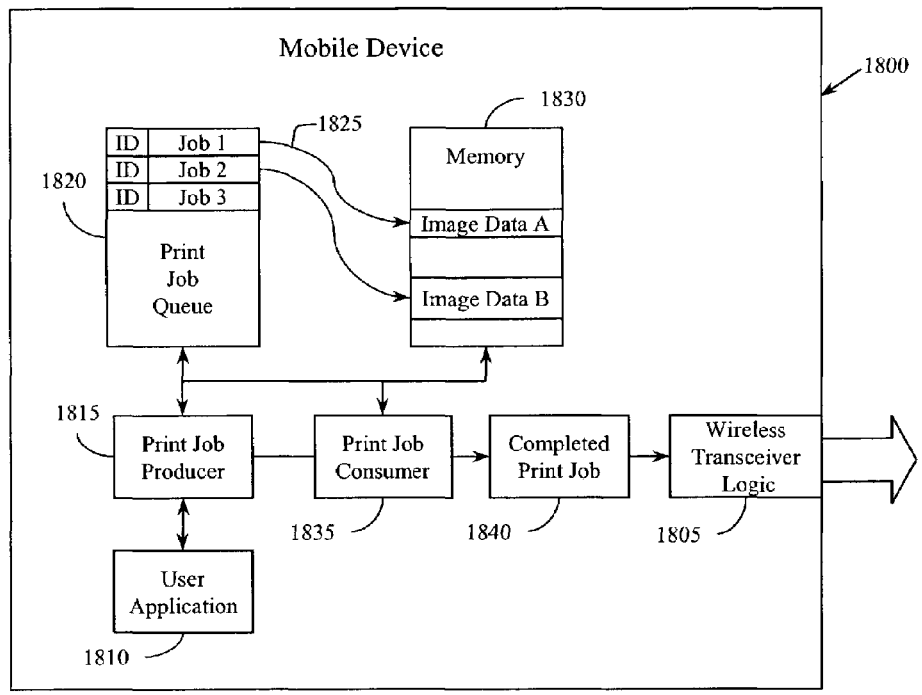
FIG. 18 illustrates another embodiment of a wireless mobile device with a print request processing system.

Illustrated in FIG. 18 is another embodiment of a mobile device 1800 configured to receive multiple print requests and process multiple simultaneous print jobs. Various components shown in previous embodiments of mobile devices described herein may also be included but are not shown in FIG. 18. The mobile device 1800 will be described with reference to a configuration where the mobile device is wireless enabled and communicates print requests to a server device that is a compatible wireless enabled device. To that end, a wireless transceiver logic 1805 is provided. The previously described processes of searching for and locating a server device may also be embodied here.

A user application 1810 can include any type of user software capable of generating a print request. Through the user application 1810, a user may request that an object, such as a photograph, document, or other data, be printed on a discovered wireless enabled server device. To initially process the print request, a print job producer 1815 is configured to receive one or more print requests. In one embodiment, the producer 1815 may be configured as logic. Since a print request may take some time until the object is imaged on a server device, the print job producer 1815 is configured to accept a print request and pass processing control back to the user application 1810 such that the user can perform other tasks while the print request is processing. In other words, the print request is accepted and processed as a background task by the operating system.

After a print request is received by the print job producer 1815, additional print requests can be received before any one print request is completed. In one embodiment, a print job queue 1820 is allocated to maintain print jobs on any type of computer-readable medium. The print job producer 1815 generates a print job for each print request and places the print job in the job queue 1820 with, for example, a job ID that allows a user to track the requested jobs. To conserve memory resources of the mobile device, the job producer 1815 configures the print job in the job queue 1820 without the actual data to be imaged, referred to herein as image data. Rather, the print job includes a reference 1825 to the image data that allows the image data to be located. The reference, also referred to a reference data, may be one or more pointers, links, addresses, or other desired type of references that allows the image data to be located. For example in FIG. 18, job 1 references image data A from a memory or storage 1830 and job 2 references image data B. Of course, a single print job may also refer to multiple instances of image data that is to be printed. In one embodiment, a print job in the job queue 1820 may include just a reference to its image data.

In response to the job queue 1820 containing a print job, a print job consumer 1835 is configured to process the print jobs. To process a print job, the print job consumer 1835 reads the data from the print job including the reference data and builds the print job with its associated image data. Using the reference data, the print job consumer 1835 retrieves the associated image data and combines and formats it with other print job data, if any, to generate a completed print job 1840. The completed print job 1840 can then be transmitted to a wireless enabled server device, such as a bluetooth enabled printer, by the wireless transceiver logic 1805 according to a desired communication protocol. The completed print job 1804 may also be regarded as a valid print job because it has a form that is understandable by an imaging device that is to process the job. The print jobs in the job queue 1820 normally would not be processed by an imaging device unless the imaging device understood its form and was able to retrieve the associated image data using the reference data.

In one embodiment, the print job consumer 1835 is configured to retrieve the image data from memory 1830 for a print job when that print job is currently being processed. Other pending print jobs would not include their associated image data. Retrieving the image data requires another copy of the data to be maintain which consumes resources. Thus, reducing the amount of image data that is copied multiple times which should reduce the number of consumed resources.

In another embodiment, the job producer 1815 and the job consumer 1835 can be configured as a common logic component or multiple components. The print job consumer 1835 can also be configured to function asynchronously with other processes on the mobile device 1800 such that the processing of print requests/jobs can be performed while the user application 1810 or other application can simultaneously submit new print requests. This would be controlled by the operating system or alternatively, the producer 1815 and/or consumer 1835 may be part of the operating system, embodied as a device driver, or may take other forms. In this manner from a user's point of view, the mobile device 1800 can receive and accept one or more print requests from a user and allow the user to perform other tasks before the print request is complete.

As previously mentioned in one embodiment, the image data associated with a print job is in a non-imaging ready format or non-print ready format, such as a JPEG format. Building the completed print jobs 1840 with this type of data format saves time and resources since print ready data can be substantially larger. Thus, transmitting non-print ready data in the print job to a server device can save transmission time. In this case, the server device should have rendering capability in order to render print ready data from the non-print ready print job.

Figure 19:
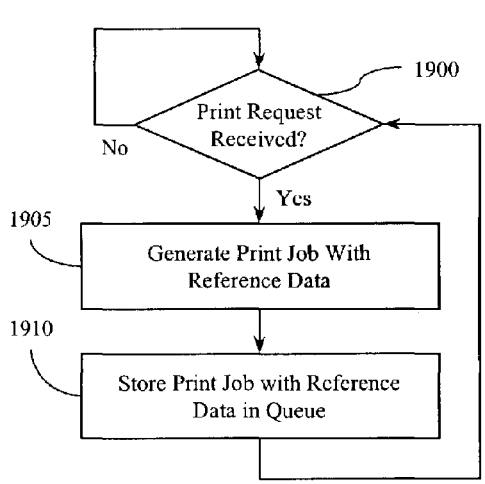
FIG. 19 illustrates one embodiment of a methodology for processing print requests into a print queue.

Illustrated in FIG. 19 is one embodiment of a methodology for processing print requests on a mobile device, for example, by the print job producer 1815. The process initiates when a print request is received that desires to print a selected image data (block 1900). A print job is generated with a reference to the image data (block 1905) and the print job is stored in a queue (block 1910). Processing would be returned to the requesting application so that other tasks could be performed simultaneously.

Figure 20:
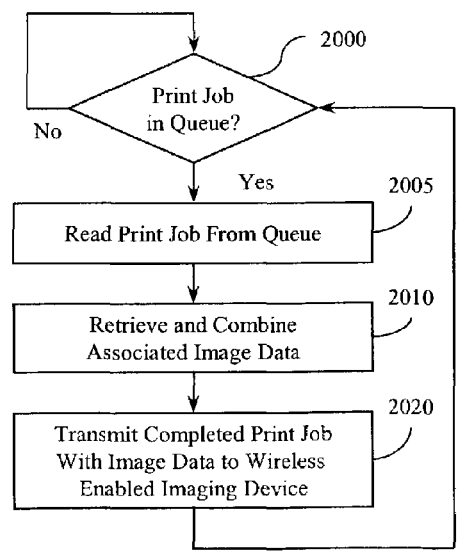
FIG. 20 illustrates one embodiment of a methodology for processing print requests out of the print queue.

Illustrated in FIG. 20 is one embodiment of a methodology for processing print jobs on a mobile device, for example, by the print job consumer 1835. The process initiates when a print job is placed in a print queue (block 2000). The print job is retrieved which includes the reference data to the associated one or more image data to be printed (block 2005). The image data is then retrieved and combined to form a completed print job (block 2010). In one embodiment, print jobs that are not currently being processed would not be combined with their corresponding image data but would be maintained with the reference data. Once a print job is next to be processed, it would then be combined with the image data to form a completed print job. The completed print job and data can then be transmitted to a wireless enabled imaging device assuming that a communication link can be established in accordance with a selected communication protocol. In one embodiment, the protocol is based on the Bluetooth specification.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method comprising:
   receiving data over a wireless data connection indicative of presence of compatible components;
   displaying a selection of the compatible components;
   continued receiving data further identifying the compatible components; and
   changing the displayed selection of compatible components in accordance with a convention and based on the continued receipt of the data that further identifies the compatible components; and
   wherein the method is performed automatically by a wireless mobile device.

2. The method as set forth in claim 1, where the changing comprises reordering the displayed selection of compatible components.

3. The method as set forth in claim 1, further comprising:
   initiating a search process; and
   determining capabilities of the compatible components from the received data.

4. The method as set forth in claim 1, where the continued receiving data comprises asynchronously receiving the data while performing another function.

5. The method as set forth in claim 1, further comprising;
   filtering selected compatible components from the displayed selection of compatible components.

6. The method as set forth in claim 5, where the filtering comprises:
   changing a displayed icon representative of a compatible component detennined to be undesirable.

7. The method as set forth in claim 1, further comprising:
   sorting selected compatible components based on attributes derived from the continued receipt of data.

8. The method as set forth in claim 7, where the sorting comprises:
   reordering the displayed section of compatible components based on an attribute selected from the set of alphanumeric, prior use, most frequently used, selected capabilities, and user defined.

9. The method as set forth in claim 1, further comprising:
   comparing received data from a compatible component to stored data representing previously identified components.

10. A mobile device comprising:
    wireless transceiver logic configured for selective data communication with other wireless devices;
    search logic having access to data communicated from the other wireless devices during a wireless discovery process, the search logic configured to organize the data communicated from the other wireless devices including data relating to identification of the other wireless devices, and subsequently reorganize the data based on characteristics including the data related to the identification communicated from the other wireless devices; and
    a display in operative connection with the search logic, the display capable of displaying the organized data.

11. The mobile device as set forth in claim 10, further comprising;
    a data structure in data communication with the wireless transceiver logic, the data structure capable of storing data including the data communicated from the other wireless devices.

12. The mobile device as set forth in claim 11, where the data structure is configured for data communication with the search logic and stores data including the organized data from the search logic.

13. The mobile device as set forth in claim 11, where the data structure comprises non-volatile memory.

14. The mobile device as set forth in claim 11, where the search logic comprises:
   filtering logic in data communication with the data structure, the filtering logic configured to selectively filter data representative of other wireless devices based on a protocol.

15. The mobile device as set forth in claim 11, where the search logic comprises:
   sorting logic in data communication with the data structure, the sorting logic configured to sort data representative of other wireless devices based on one or more attributes received from the other wireless devices.

16. The mobile device as set forth in claim 10, further comprising:
   an historical data structure for storing characteristics of the other wireless devices previously received.

17. The mobile device as set forth in claim 16, where the search logic comprises:
   fast filtering logic in data communication with the data structure and the historical data structure, the fast filtering logic configured to selectively filter data representative of other wireless devices upon comparison of characteristics determined from the other wireless devices and characteristics in the historical data structure.

18. The mobile device as set forth in claim 16, where the search logic comprises:
   fast sorting logic in data communication with the data structure and the historical data structure, the fast sorting logic configured to sort data representative of other wireless devices upon comparison of characteristics determined from the other wireless devices and characteristics in the historical data structure.

19. An article of manufacture embodied in computer-readable medium for use in a device configured to display results of a search for compatible wireless devices, the article of manufacture comprising:
   wireless transceiver logic configured to cause a processor to receive characteristic data from comparable wireless devices;
   display logic configured to cause a processor to access the characteristic data presently communicated from the compatible wireless devices, where the display logic iteratively arranges representations of individual compatible wireless devices according to an algorithm using the data presently communicated subsequent data received; and
   categorizing logic configured to cause a processor to access the characteristic data presently communicated from the compatible wireless devices, and to access characteristic data previously communicated from wireless devices, where the categorizing logic influences the arrangement and display of individual device representations based on a comparison of the data presently communicated and the data previously communicated.

20. A method, comprising:
   wirelessly receiving, by a mobile phone, information about imaging capabilities of a printer presently capable of wirelessly receiving a print job from the mobile phone;
   displaying, by the mobile phone, an icon to represent the printer;
   while displaying the icon, wirelessly receiving, by the mobile phone, additional information about imaging capabilities of the printer; and
   dynamically updating, by the mobile phone, the displayed icon so as to visually indicate to a user the additional information.

21. The method as set forth in claim 20, wherein the additional information comprises an indication that the printer is a bluetooth print profile (BPP) printer; and wherein the updating comprises modifying the icon to visually indicate that the printer is a BPP printer.

22. The method as set forth in claim 20 further including:
   wirelessly receiving, by the mobile phone, information from a plurality of printers;
   the displaying includes displaying an icon for each of the plurality of printers; and
   the dynamically updating includes changing a visual indication of each icon based on determined capabilities of the plurality of printers as additional information is received by the mobile device from the plurality of printers.

23. The method as set forth in claim 20 wherein the additional information includes data representing the imaging capabilities of the printer that causes the displayed icon to be updated.

24. The method as set forth in claim 20 wherein the dynamically updating includes updating the displayed icon to represent a change in status of the printer as the additional information about the printer is received.

25. The method as set forth in claim 1 wherein the displaying includes displaying image forming devices determined from the compatible components.

26. The method as set forth in claim 1 further including:
   filtering the compatible components to determine which are image forming devices; and
   displaying icons for each of the image forming devices determined from the compatible components.

27. The method as set forth in claim 26 wherein the changing includes reordering the icons displayed for the image forming devices based on continued receipt of imaging capabilities from the image forming devices.

28. The method as set forth in claim 27 where the reordering is based on a relevance determined for each of the image forming devices based on associated imaging capabilities.

29. The mobile device as set forth in claim 10 where the search logic includes a filter logic configured to filter the data communicated from other wireless devices and determine which of the other wireless devices are imaging devices, and to cause the display to display data representing the imaging devices.

30. The mobile device as set forth in claim 10 further including logic to cause the display to display a printer icon for each printing device identified by the search logic based on the data communicated from the other wireless devices.

31. The mobile device as set forth in claim 10 where the other wireless devices include one or more image forming devices and the mobile device being configured to transmit wireless print requests to a selected image forming device.

* * * * *

UNITED STATES PATENT AND TRADEMARK OFFICE
CERTIFICATE OF CORRECTION

PATENT NO. : 7,272,407 B2  
APPLICATION NO. : 10/369042  
DATED : September 18, 2007  
INVENTOR(S) : Michael Strittmatter et al.

It is certified that error appears in the above-identified patent and that said Letters Patent is hereby corrected as shown below:

Title Pg, Item (56), under "Foreign Patent Documents", delete "GB   2360914   10/2001". (Entry Repeated)

In column 22, line 24, in Claim 5, delete "comprising;" and insert -- comprising: --, therefor.

In column 22, line 30, in Claim 6, delete "detennined" and insert -- determined --, therefor.

In column 22, line 36, in Claim 8, delete "section" and insert -- selection --, therefor.

In column 22, line 59, in Claim 11, delete "comprising;" and insert -- comprising: --, therefor.

In column 23, line 41, in Claim 19, delete "comparable" and insert -- compatible --, therefor.

In column 23, line 48, in Claim 19, after "communicated" insert -- , and --.

Signed and Sealed this

Twelfth Day of August, 2008

JON W. DUDAS  
*Director of the United States Patent and Trademark Office*